(12) United States Patent
Sommer

(10) Patent No.: US 8,293,041 B2
(45) Date of Patent: Oct. 23, 2012

(54) METHOD OF MAKING A FIBER LAMINATE

(75) Inventor: Sebastian Sommer, Troisdorf (DE)

(73) Assignee: Reifenhaeuser GmbH & Co. KG Maschinenfabrik, Troisdorf (DE)

( * ) Notice: Subject to any disclaimer, the term of this patent is extended or adjusted under 35 U.S.C. 154(b) by 161 days.

(21) Appl. No.: 11/708,819

(22) Filed: Feb. 21, 2007

(65) Prior Publication Data

US 2007/0143976 A1 Jun. 28, 2007

Related U.S. Application Data

(62) Division of application No. 10/966,839, filed on Oct. 15, 2004, now abandoned.

(30) Foreign Application Priority Data

Oct. 17, 2003 (EP) ..................................... 03023432

(51) Int. Cl.
*D04H 5/02* (2012.01)
*B29C 59/04* (2006.01)
(52) U.S. Cl. ........ 156/62.2; 156/148; 156/181; 156/209
(58) Field of Classification Search ................. 156/62.2, 156/148, 179, 181, 209, 220, 290; 442/384
See application file for complete search history.

(56) References Cited

U.S. PATENT DOCUMENTS

| 3,616,157 | A  | * | 10/1971 | Smith ........................... 428/171 |
| 3,855,046 | A  | * | 12/1974 | Hansen et al. ................. 428/198 |
| 4,315,965 | A  | * | 2/1982  | Mason et al. .................. 428/198 |
| 4,436,780 | A  | * | 3/1984  | Hotchkiss et al. ............. 428/198 |
| 5,529,563 | A  | * | 6/1996  | Veith et al. .................... 493/395 |
| 6,572,735 | B1 | * | 6/2003  | Wallajapet et al. ........... 162/115 |
| 2002/0168910 | A1 | * | 11/2002 | Vuillaume et al. ............ 442/381 |
| 2003/0106195 | A1 | * | 6/2003  | Fleissner ......................... 28/104 |
| 2004/0121693 | A1 | * | 6/2004  | Anderson et al. ............. 442/401 |

FOREIGN PATENT DOCUMENTS

| EP | 0032772 A1 | * | 7/1981 |
| WO | WO 01/51693 A1 | * | 7/2001 |
| WO | WO 01/53588 A2 | * | 7/2001 |

* cited by examiner

*Primary Examiner* — Michael Tolin
(74) *Attorney, Agent, or Firm* — Andrew Wilford

(57) ABSTRACT

A fiber laminate for use as an absorbent cleaning cloth is made by first preconsolidating by calendering at least one spun-bond web of filaments and then applying at least one fiber layer of hydrophilic natural or converted cellulose fibers to the pre-consolidated spun-bond web. The two layers are then hydrodynamically consolidated into a two-layer laminate, and a surface of the hydrodynamically consolidated two-layer laminate is embossed.

6 Claims, 2 Drawing Sheets

METHOD OF MAKING A FIBER LAMINATE

CROSS REFERENCE TO RELATED APPLICATION

This application is a division of copending application Ser. No. 10/966,839 filed 15 Oct. 2004 now abandoned, with a claim to the priority of European application 03 023 432 2 filed 17 Oct. 2003.

FIELD OF THE INVENTION

My present invention relates to a fiber laminate comprising at least one spun-bond web made of filaments and having at least one fiber layer made of hydrophilic fibers. The invention further relates to a method for producing such a fiber laminate. The fiber laminate according to the invention is especially useful as an absorbent cleaning cloth or wiping cloth.

BACKGROUND OF THE INVENTION

Various fiber laminates which can be used as cleaning cloth are known in practice. Corresponding methods for produce them also known.

Generally two calendered spun-bond webs are initially produced. Then, a fiber layer made of hydrophilic fibers, preferably a cellulose fiber layer, is inserted between the two spun-bond webs. The laminate comprising these three layers is then subjected to a water-jet consolidation or "needling". The joining points (calender points) between the filaments of the spun-bond web formed during the calendering step by fusing crossing filaments together in the spun-bond web can generally no longer be loosened or opened during the water-jet consolidation. In this respect, a relatively closed surface of the fiber laminate is obtained. This closed surface has the advantage that it is barely sensitive to abrasions.

This known fiber laminate also has a sufficient absorptive capacity for liquids. However, solids such as house dust for example, can only poorly be incorporated into the smooth closed surface of the fiber laminate. When the fiber laminate is used as a cleaning cloth, this solid dirt is pushed in front of the cloth as it were and is only barely picked up by the surface of the fiber laminate.

Attempts have been made to loosen, open up or structure the surface of the fiber laminate in the course of the water-jet consolidation. For this purpose, for example, the water-jet consolidation has been carried out on a contoured support. With this treatment, however, no satisfactory opening of the spun-bond web surface, to better pick up dust could be achieved. In addition, as a result of the penetration of water jets, hydrophilic fibers were removed from the fiber laminate in an undesirable fashion. In this respect, the known fiber laminates are capable of improvement.

OBJECTS OF THE INVENTION

The object of the invention is to provide an improved a fiber laminate of the type specified initially which has an enhanced absorbency for solids or for solid dirt.

Another object is to provide an improved method of making a fiber laminate.

SUMMARY OF THE INVENTION

These objects are attained with a fiber laminate, especially as absorbent cleaning cloth, comprising at least one pre-consolidated spun-bond web made of filaments and comprising at least one fiber layer made of hydrophilic fibers, wherein the fiber laminate is hydrodynamically consolidated and wherein embossing deformations are incorporated into the surface of the hydrodynamically consolidated fiber laminate. The embossing deformations are preferably plastic deformations of the fiber laminate surface and thus as it were permanent deformations.

The term "fiber laminate" within the scope of the invention means a multilayer product or a laminate comprising at least one fiber layer made of hydrophilic fibers and at least one layer of filaments. The term filaments means continuous strands i.e. theoretically infinitely long threads from which the spun-bond web is formed. "Filaments" within the scope of the invention mean especially strands made of a thermoplastic plastic.

The filaments of the spun-bond web preferably consist of a polyolefin or of a polyester. According to one embodiment, the filaments of the spun-bond web consist of at least one plastic from the group which of consists of polyethylene, polypropylene and polyethylene terephthalate. Mixtures of filaments made of different plastics can also be used. According to one embodiment of the invention, a spun-bond web consists of multicomponent filaments or bicomponent filaments. It is within the scope of the invention that the pre-consolidated spun-bond web comprises a pre-consolidated and pre-deformed spun-bond web.

The hydrophilic fibers comprise water-absorbent fibers. Fibers made of natural and/or converted cellulose, such as pulp fibers for example, can be used as hydrophilic fibers. The fiber layer made of hydrophilic fibers forms an absorbent layer of the fiber laminate according to the invention. According to one embodiment of the invention, the hydrophilic fibers are applied to the pre-consolidated spun-bond web using at least one card and/or using at least one air-layering device.

The embossing deformations according to the invention are incorporated into at least one spun-bond web or the relevant spun-bond web surface of the fiber laminate.

According to a preferred embodiment of the invention, however, the embossing deformations continue into the fiber layer made of the hydrophilic fibers.

According to a particular embodiment of the invention, the embossing deformations extend from the one (upper) spun-bond web layer through the fiber layer made of hydrophilic fibers into the second (lower) spun-bond web layer. The fiber laminate then therefore more suitably has recesses on the one laminate surface and elevations on the other opposite laminate surface, which form the embossing deformations.

According to one embodiment of the invention, a plurality of punctiform embossing deformations is provided in the surface of the fiber laminate. In this case, these can comprise regularly or irregularly arranged punctiform embossing deformations.

According to another embodiment of the invention, linear embossing deformations are provided in the surface of the fiber laminate. These linear deformations can also be arranged regularly or however also irregularly.

According to one embodiment of the invention, the fiber laminate has both punctiform embossing deformations and linear embossing deformations in the surface. As has already been described above, an embossing deformation comprises an elevation and/or a recess in the laminate or spun-bond web surface. Such an elevation or recess has side flanks as well as a plateau with corresponding plateau surface. It is within the scope of the invention that a plurality of embossing deformations or of recesses and/or elevations is produced which each have a relatively small plateau surface.

The embossing depth (or embossing height) of the embossing deformations is more suitably 0.1 to 5 mm, preferably 0.3 to 4 mm, preferably 0.4 to 3.5 mm and very preferably 0.5 to 3 mm. Thus, the embossing depth or embossing height here means the distance of the plateau of an embossing deformation from the spun-bond web surface. According to one embodiment of the invention, the embossing depth or embossing height is constant or substantially constant over the entire surface of the spun-bond web. According to another embodiment of the invention, embossing deformations of different embossing depth or embossing height are distributed over the surface of the spun-bond web.

It is within the scope of the invention that the fiber layer made of hydrophilic fibers is arranged between two spun-bond webs or spun-bond web layers. Thus, a second spun-bond web or a second pre-consolidated spun-bond web is more suitably applied to the fiber layer made of hydrophilic fibers applied to is the first pre-consolidated spun-bond web.

According to one embodiment of the invention, the embossing deformations are only constructed in the surface of one spun-bond web.

According to a preferred embodiment of the invention, embossing deformations are provided in the surfaces of both spun-bond webs.

The subject matter of the invention is also a method for producing a fiber laminate, especially an absorbent cleaning cloth, wherein at least one spun-bond web comprising filaments is pre-consolidated, wherein at least one fiber layer made of hydrophilic fibers is applied to the pre-consolidated spun-bond web, wherein the laminate comprising spun-bond web and the fiber layers are hydrodynamically consolidated and embossing deformations are incorporated into the surface of the hydrodynamically consolidated fiber laminate.

It is within the scope of the invention that a second pre-consolidated spun-bond web is applied to the fiber layer made of the hydrophilic fibers and that the resulting fiber laminate is then hydrodynamically consolidated. The fiber layer made of the hydrophilic fiber is thus more suitably located between two spun-bond webs or spun-bond web layers.

According to a preferred embodiment of the invention, the pre-consolidation of the at least one spun-bond web is carried out using a calender, especially using a hot-embossing calender.

It is within the scope of the invention that the fiber laminate made of the spun-bond web or of the spun-bond webs and the fiber layer is hydrodynamically consolidated by water-jet treatment. During such water-jet consolidation or water-jet needling, fine, very fast water jets or high-pressure water jets consolidate the fiber laminate or the spun-bond web.

It is within the scope of the invention that the fiber laminate is dried after the hydrodynamic consolidation. This drying of the fiber laminate takes place in at least one drier, which for example is constructed as a tumble drier.

According to one embodiment of the invention, the embossing deformations are incorporated into the fiber laminate surface after the hydrodynamic consolidation and before the drying of the fiber laminate. In other words, the embossing deformations are produced in the still-wet fiber laminate.

According to another embodiment of the invention, the embossing deformations can be incorporated during the drying or in the drier. Thus, for example, the production of embossing deformations can take place between two drying drums in a partly dried state of the fiber laminate.

According to a further embodiment of the method according to the invention, the embossing deformations are incorporated into the fiber laminate surface after the drying of the fiber laminate or after the drier.

Fundamentally, however, it is also within the scope of the invention to incorporate the embossing deformations into the fiber laminate in a separate step, as it were offline. Then the incorporation of the embossing deformations does not take place as part of a continuous production process of the fiber laminate or the cleaning cloth. This offline production makes it possible to produce smaller quantities of fiber laminate without it being necessary to intervene in the continuous production of a fiber laminate to be used otherwise. The fiber laminate is preferably moistened before the offline incorporation of the embossing deformations.

Depending on the time of incorporation of the embossing deformations (i.e., before, during or after the drying or offline), the temperature and also the moisture or residual moisture of the fiber laminate differs. As a result, the friction values between the fibers or filaments vary. It is within the scope of the invention that the method according to the invention or the production of the embossing deformations is carried out with the proviso that the fiber laminate surface or the spun-bond web surface is plastically deformed. The embossing deformations should also be retained after a use of the fiber laminate as moistened cleaning cloth.

It is within the scope of the invention that binders such as latex, for example are incorporated into the fiber laminate or into a spun-bond web and/or that binding fibers made of a low-melting thermoplastic, such as polyethylene for example are added. It is then further within the scope of the invention that after the embossing deformations have been produced, activation or thermal activation of the binder and/or the binding fibers is effected in order to stabilize the structure achieved during the embossing deformation. If heating to high temperatures, for example, heating to 100° C. or more, is required for this activation, the incorporation of the embossing deformations is preferably carried out before or during the drying. In this way, heating the fiber laminate two or more times is avoided.

According to a preferred embodiment of the invention already mentioned above, the embossing deformation of the fiber laminate takes place during drying, more appropriately in the drier and in the semi-dried state of the fiber laminate. In this embodiment, the heat of the drying process is used to pre-heat the fiber laminate and as a result, an effective deformation of the web layers is possible. If the still-wet hydrophilic fibers are co-deformed during the embossing deformation, the risk of cracking reduces. During the subsequent finish-drying of the hydrophilic fibers the embossed structure of the cleaning cloth is then frozen in.

It is within the scope of the invention that the embossing deformations are produced using an embossing device with at least one structured embossing surface. The embossing deformations are preferably produced using a structured harder embossing surface acting on one side of the fiber laminate and a softer embossing surface arranged on the other side of the fiber laminate. The structured harder embossing surface as it were engages into the fiber laminate and is pressed into the softer embossing surface. Then, one side of the fiber laminate has recesses whilst the other side of the fiber laminate has elevations.

According to one embodiment of the invention, the incorporation of the embossing deformations into the fiber laminate takes place between two rollers wherein at least one of the two rollers has a structured surface. A "structured surface" or "structured embossing surface" means within the scope of the invention especially a surface from which embossing elements project which are preferably constructed as knobs and/or cross-pieces. The embossing deformations are thus more appropriately produced using at least one roller with a structured embossing surface acting on the fiber laminate. The roller with the structured embossing surface is preferably a steel roller. According to a preferred embodiment, the fiber laminate is guided between two rollers wherein the first roller is a steel roller with a structured embossing surface and the second roller is a roller with a softer surface, preferably with a rubber surface. The structured embossing surface of the steel roller is then as it were pressed into the rubber surface of the second roller.

According to another embodiment of the invention, the fiber laminate is guided between two rollers made of metal, preferably between two steel rollers. In this case, the rollers are preferably constructed such that the embossing elements or embossing elevations engage or dip into corresponding embossing recesses of the other roller. More appropriately, each of the two rollers has embossing elevations and embossing recesses. Assigned to the embossing elevations of one roller are complementary embossing recesses of the other roller. A fiber laminate produced with this embossing device then has elevations and recesses on each side.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
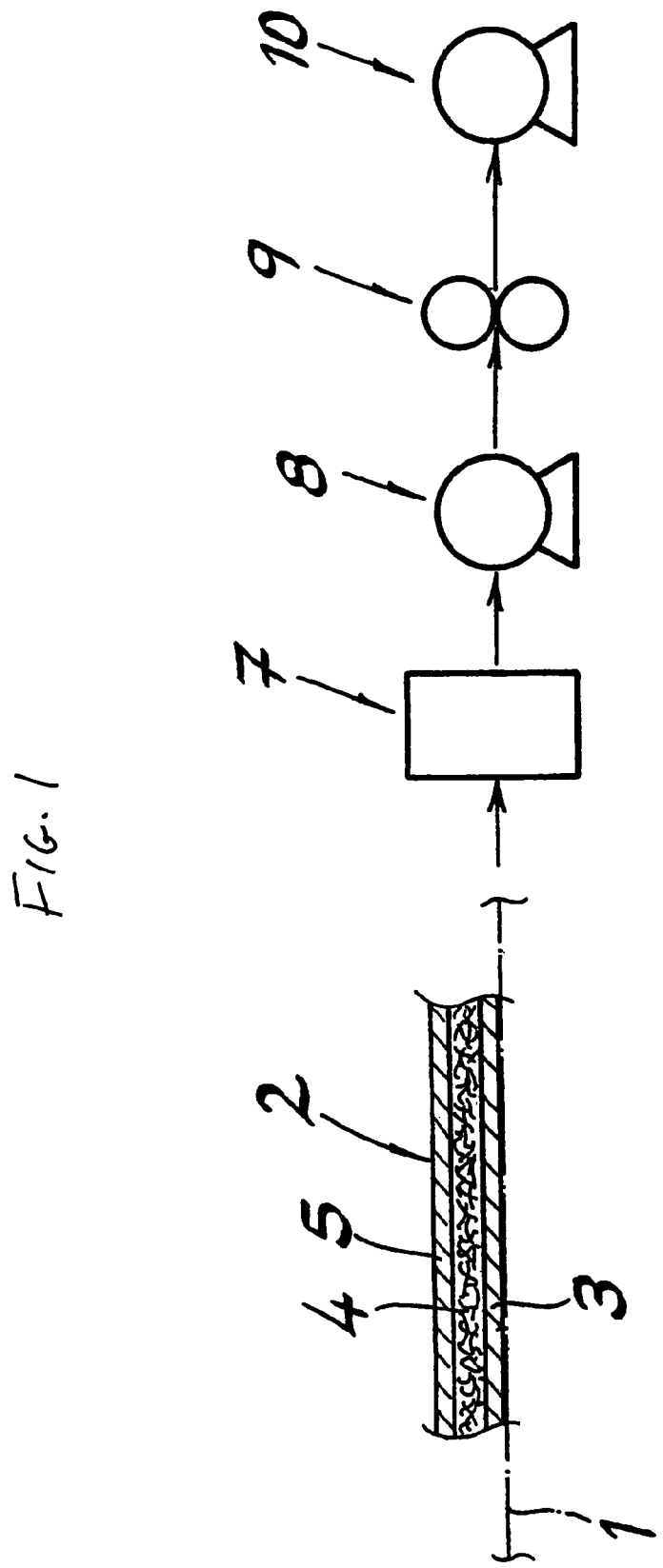
FIG. 1 is a diagram illustrating the method.

On a conveyor belt, for example, a distributing drain belt 1, a fiber laminate 2 is conveyed in the direction of the arrows. The fiber laminate 2 consists of a first spun-bond web 3 lying directly on the distributing drain belt 1, a fiber layer 4 made of hydrophilic fibers arranged thereon, and a second spun-bond web 5 arranged on the fiber layer 4. According to one embodiment of the invention, the fiber laminate 2 can be produced online, wherein the filaments of the first spun-bond web 3 are first laid on the distributing drain belt 1 and then the fiber layer 4 is applied and thereafter the second spun-bond web 5 is placed on the fiber layer 4. According to a preferred embodiment of the invention, however, the work is executed offline. The fiber laminate 5 is formed of spun-bond webs 3, 5 already produced previously and pre-consolidated, and for this the spun-bond webs 3, 5 are combined with the fiber layer 4.

The resulting fiber laminate 2 is then hydrodynamically consolidated in a consolidation station 7. Thereafter the consolidated fiber laminate 2 is subjected to drying and for this purpose is initially fed into a first drying stage 8 which can for example comprise a tumble drier. The fiber laminate 2 is then subjected to embossing deformation in an embossing device 9 in the not-yet completely dried or in the semi-wet state. The embossing device 9 may consist of a structured steel roller which engages in an opposing rubber roller. In this case, the fiber laminate 2 is guided between the two rollers. After the embossing deformation the fiber laminate 2 is fed into a second drying stage 10 which for example also consists of a tumble drier. Here the fiber laminate 2 is more appropriately finish-dried.

Figure 2:
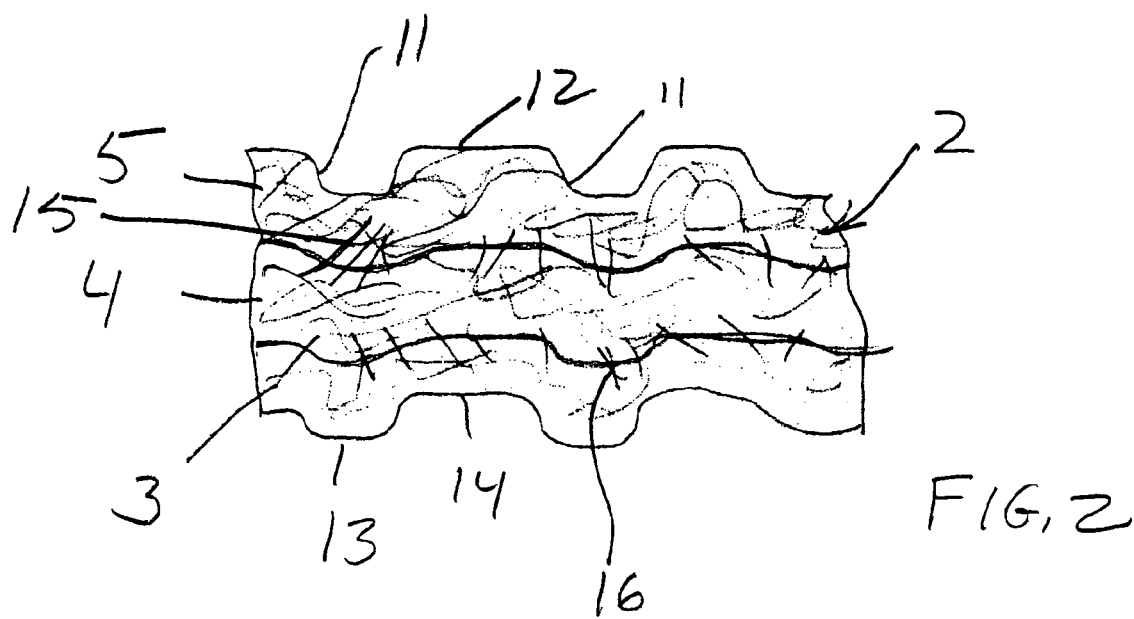
FIG. 2 is an enlarged section through the laminate.

In FIG. 2, I have shown the wiping cloth in cross section with its spun bond layers 3 and 5 sandwiching the cellulose fiber layer 4 between them. As is represented at 15 and 16 in FIG. 2, fibers from the cellulose fiber layer are "needled" into the layers 3 and 5 by the water-jet consolidation of the laminate 2. In addition, the upper layer 5 is shown to have been embossed with troughs 11 between crests 12 in the formation of the embossing deformations and, since those deformations in the embodiment shown extend through the laminate, complimentary crests 13 and troughs 14 are formed on the surface of the lower layer 3 at locations of the troughs 11 and crests 12 of the upper layer. Of course, the invention also includes fiber laminates formed from 2 of the layers 4, 5 without a sandwich structure or laminates in which additional fiber layers alternate with the spun bond layers. In the spun bond layers, the preconsolidated spun bonded has its filaments bonded together at closing points.

The invention is based on the finding that the fiber laminate according to the invention has a surprisingly increased capacity for absorbing solids. Solid dirt particles, for example, dust particles can easily be taken up with a fiber laminate used as cleaning cloth. It should furthermore be emphasized that the fiber laminate according to the invention can be produced simply and inexpensively using the method according to the invention. In addition, by incorporating the embossing deformations into the fiber laminate, an attractive external appearance or design of a cleaning cloth can be achieved. For this purpose the embossing deformations can be varied and combined in the most varied fashion. A visually very attractive product is obtained as a result.

I claim:

1. A method of producing a fiber laminate for use as an absorbent cleaning cloth, the method comprising the steps of sequentially:
    preconsolidating by calendering a lower spun-bond web of continuous thermoplastic filaments;
    carding or air-layering at least one core layer of hydrophilic fibers on top of the preconsolidated lower spun-bond web;
    preconsolidating by calendering an upper spun-bond web of continuous thermoplastic filaments;
    applying the preconsolidated upper spun-bond web on top of the core layer;
    hydrodynamically consolidating the lower and upper preconsolidated spun-bond webs and core hydrophilic-fiber layer into a laminate, whereby the laminate is thoroughly wetted with water;
    heating the laminate and thereby partially drying the laminate of the water and softening the thermoplastic filaments;
    while the thermoplastic filaments are still hot and softened, plastically embossing troughs each having side flanks and a plateau into an upper surface of the partially dried laminate with the troughs extending through the upper spun-bond web into the layer of hydrophilic fibers; and
    thereafter fully drying the embossed laminate.

2. The method defined in claim 1 wherein the calendering is done by a hot-embossing calender.

3. The method defined in claim 1 wherein the fiber layer and upper and lower spun-bond webs are hydrodynamically consolidated by water jet treatment.

4. The method defined in claim 1 wherein the troughs are produced using an embossing device with at least one structured embossing surface.

5. The method defined in claim 1 wherein the troughs are produced with a structured hard embossing surface acting on the upper surface of the fiber laminate and a further embossing surface engaging a lower surface of the fiber laminate.

6. The method defined in claim 5 wherein the troughs are produced using at least one roller with a structured embossing surface acting on the fiber laminate.

* * * * *